United States Patent [19]

Pohjola

[11] 4,119,356
[45] Oct. 10, 1978

[54] VEHICLE AND ENDLESS TRACK STRUCTURE THEREFOR

[76] Inventor: Jorma Toivo Tapani Pohjola, Haravatie 6, 90530 Oulu 53, Finland

[21] Appl. No.: 656,069

[22] Filed: Feb. 6, 1976

[30] Foreign Application Priority Data

Feb. 10, 1975 [FI] Finland ............................ 750359

[51] Int. Cl.$^2$ ............................................. B62D 55/24
[52] U.S. Cl. .................................. 305/35 EB; 305/44
[58] Field of Search ................ 305/35 R, 35 EB, 36, 305/38, 44; 180/9.44, 9.2 R; 198/846, 831; 74/231 R, 231 P, 231 M; 46/219

[56] References Cited

U.S. PATENT DOCUMENTS

| 3,637,266 | 1/1972 | Busse | 305/35 EB |
| 3,934,664 | 1/1976 | Pohjola | 305/44 X |

FOREIGN PATENT DOCUMENTS 2,404,966  8/1974  Fed. Rep. of Germany ............. 305/44

Primary Examiner—Stanley H. Tollberg
Assistant Examiner—John P. Shannon
Attorney, Agent, or Firm—Steinberg & Blake

[57] ABSTRACT

An endless track structure for a vehicle has opposed side edge regions which are elastic and capable of stretching and contracting. When not mounted on the vehicle, the opposed side edge regions of the endless track structure, in their unstressed condition, have a length shorter than their length when the endless track is mounted on a pair of opposed end rolls of the vehicle. Thus, when mounted on the vehicle the opposed side edge regions of the endless track are stretched to a given degree so as to have an initial prestress therein. Thus, when the vehicle executes a turn, the endless track structure will automatically contract at the inside of the turn while becoming stretched to a greater degree at the outside of the turn.

14 Claims, 8 Drawing Figures

4,119,356

VEHICLE AND ENDLESS TRACK STRUCTURE THEREFOR

BACKGROUND OF THE INVENTION

The present invention relates to an endless track structure for a vehicle as well as to a vehicle which includes such structure.

Vehicles of the above type conventionally have opposed end rolls around which the endless track structure extends so as to be supported and guided by the end rolls. When the vehicle executes a turn the track becomes shorter on the inside of the turn and longer on the outside of the turn. Such an endless track structure may have a central elongated region in the form of a centrally disposed band or the like which is in the form of a suitable reinforcement or stiffening extending parallel to the direction of vehicle travel when the vehicle track is straight, while this elongated central region is laterally bendable to assume a curvature as determined by the turning radius of the vehicle, while at the same time this central region of the track structure is substantially non-stretchable in the longitudinal direction.

Endless track structures of the above type have already been proposed. Certain structures have been proposed which are laterally elastic so as to be reversibly extensible and contractable in the lateral direction for the purpose of enabling the track to curve uniformly and smoothly when the vehicle executes a turn. The track may, for example, be pleated in an accordion fashion at both sides of the central region of the track so as to give the track elasticity in its own plane.

One of the problems encountered with endless track structures of the above general type resides in the tendency of the track to gather and bulge undesirably at localized portions, this behavior being known as "bagging". Of course, such behavior in the track, which occurs particularly when the vehicle executes a turn, is highly undesirable because of the non-uniform behavior of the track particularly when executing a turn.

SUMMARY OF THE INVENTION

It is a primary object of the present invention to improve endless track structures of the above type.

In particular, it is an object of the present invention to provide an endless track structure, and the vehicle utilizing the same, which will have no tendency toward "bagging".

Thus, it is a more specific object of the present invention to provide a vehicle and endless track structure therefor which will behave in such a way that the endless track structure will automatically contract at an inner side of a turn while automatically increasing in length at an outer side of a turn, with the contraction and elongation at the inside and outside, respectively, of the turn taking place uniformly along the entire length of the track.

A further object of the present invention is to provide a track structure of the above type which is composed of a number of simple rugged elements which can conveniently be joined together to form the entire track.

Also, it is an object of the present invention to provide an endless track structure of the above type which is made of a single body of sheet material of relatively simple rugged construction capable of achieving the desired objects.

According to the invention, when the endless track structure is mounted on a pair of opposed end rolls of a vehicle, the opposed side edge regions of the endless track structure are stretched so as to have a given internal prestress at the opposed side edge regions of the track when the track is straight. However, when the vehicle executes a turn so that the track becomes curved, then it will automatically contract at the inner side of the turn with the internal prestress being correspondingly reduced while at the outer side of the turn the internal stress of the track is increased beyond the internal prestress of the track in its straight condition.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
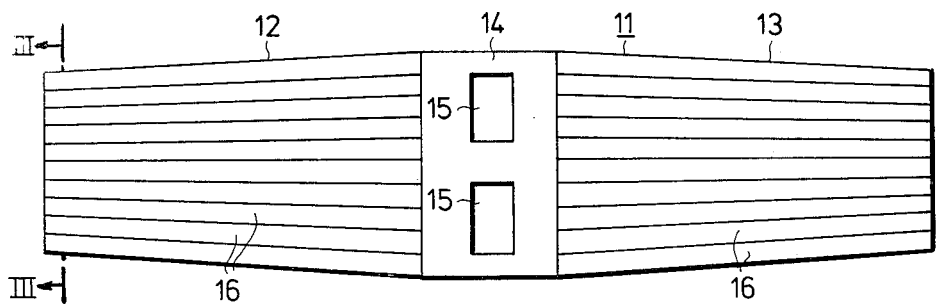
FIG. 1 is a schematic illustration of one component of an endless track structure according to the invention.
Figure 7:
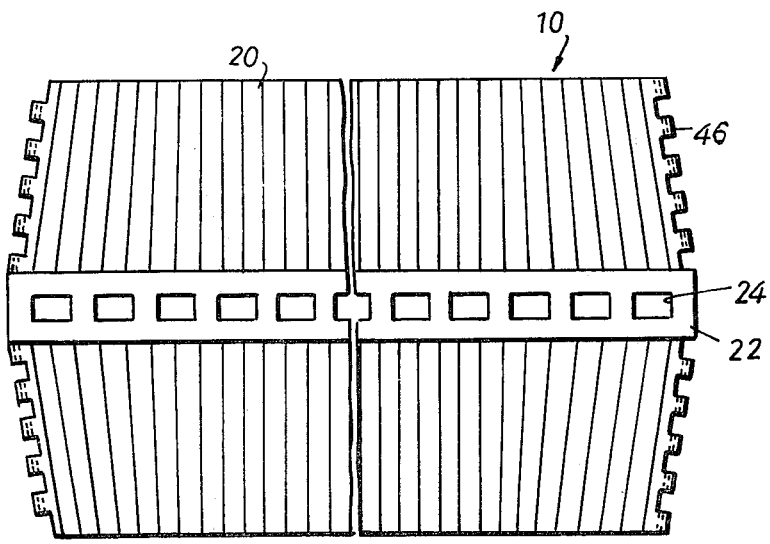
FIG. 7 is a fragmentary schematic illustration of another embodiment of an endless track structure of the invention shown in FIG. 7 in its unstressed condition before it is mounted on a vehicle.
Figure 8:
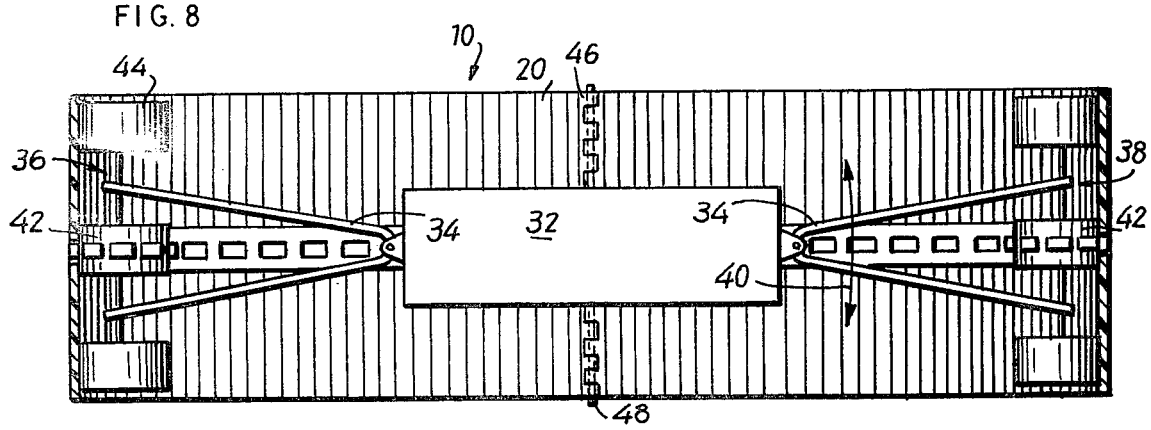
FIG. 8 schematically shows part of a vehicle provided with an endless track structure as shown in FIG. 7.

In the various embodiments of the invention illustrated in the drawings there is an endless track means 10. In the embodiment of FIG 1, there is illustrated one of a plurality of elements or components of an endless track means of the invention. Thus, FIG. 1 shows a single element or component 11 of an endless track means. However, the endless track means may be made of a single body of material in its entirety, as shown in FIGS. 7 and 8 and described below.

As is apparent from FIG. 1, the element 11 of the endless track means has a pair of opposed lateral regions 12 and 13 separated from each other by a longitudinally extending central region 14. This central region 14 is substantially non-stretchable. When the several elements 11 are joined together, in any suitable way, such as that shown in FIG. 5 and described below, the successive central regions 14 provide the endless track means with a longitudinally extending central region which is substantially non-stretchable but which at the same time is laterally bendable so that the track means can assume a curvature as required by the turning radius of the vehicle, with this curve being smooth and free of kinks. At its central region 14 the endless track means is formed with openings 15 for receiving teeth of supporting and/or traction gear wheels or the like as shown in FIG. 8 and described below.

The opposed elongated lateral regions 12 and 13 of each element 11 of the endless track means of FIG. 1 are made of a suitable elastic material, for example, of a plastic sheet material. These portions 12 and 13 of plastic sheet material are subjected to a pressing action in such a way that the portions 12 and 13 are compressed to a more intense degree as the distance of each part of each portion 12 and 13 increases from the central region 14. In other words this central region 14 of the plastic sheet material remains in its initial condition while compression to an increasing degree is provided laterally away from the central region 14 toward the outer opposed side edge regions of the elements 11. In this way there is produced in these opposed side edge regions 12 and 13 an internal stressed state of a certain magnitude. These portions 12 and 13 made of plastic sheet material are then heat-treated so that the internal stresses therein are completely relieved, and now the element 11 will remain in the configuration illustrated in FIG. 1. The same procedure is carried out in the event that the entire track is made of a single body of plastic sheet material as disclosed in FIG. 7 and described below. Thus, in connection with FIG. 7 also a similar pressing and heat treatment procedure is carried out so that as shown in FIG. 7, the single body of plastic sheet material 20 which forms the entire endless track means is shorter at its opposed side edge regions than at its elongted central region 22 which is substantially non-stretchable and corresponds to the successive regions 14 of successive elements 11 of FIG. 1, this substantially non-stretchable central region 22 being formed with the openings 24 which respectively corresponds to the openings 15.

Many plastic materials are available to be treated in a manner described above so as to provide an endless track means suitable for use in a vehicle, in accordance with the present invention. For example, the plastic sheet material may be polystyrene, polyvinylchloride, polybutadiene, or polypropylene.

In the case where a plurality of elements 11 as shown in FIG. 1 are provided, these elements are suitably assembled in end-to-end relation to form the complete endless track means. As is apparent from FIG. 1, the element 11 has at each side of the central region 14 a plurality of elongated laterally extending portions 16. These portions 16 at the adjoining end edges of a pair of elements 11 are fragmentarily illustrated in FIG. 5. Thus, the adjoining end edges of a pair of elements 11 are of a toothed configuration so as to fit into each other as illustrated in FIG. 5. These toothed portions 26 are formed with bores passing therethrough and all of these bores become aligned with each other so that a suitable connecting rod 28 can be passed through the several interlocking toothed portions of a pair of elements 11 for connecting them to each other. Of course, the elongated portions 16 may, if desired, also be separate from each other and connected together in the manner shown in FIG. 5 to form a unit 11 or a unit 11 may have the portions 16 formed integrally one with the next from a single body of sheet material. At their outer ends the portions 16 extend along elongated stretchable elements 30 which are stepped at their adjoining ends and bored so as to receive the ends of the rod 28, as shown in FIG. 5. The portions 16 preferably have the corrugated configuration 17 illustrated in FIG. 3. When the several elements 11 are joined one to the next and then formed into an endless track means, the length of the outer opposed side edge regions will of course be equal to the length of the elongated central region 14, and thus when mounted on the vehicle the several elements will be stretched to have the condition shown in FIG. 4.

In the same way, the opposite ends of the sheet 20 are of a toothed configuration with each toothed portion being formed with a bore passing therethrough so that the opposed ends of the sheet 20 shown in FIG. 7 can be joined together in the same way as shown in FIG. 5 with a suitable rod passing through the interlocking teeth at the ends of the sheet, and this connection is made when the endless track means is mounted on the vehicle.

For example, as is shown schematically in FIG. 8, the vehicle has a frame portion 32 to the opposite ends of which there are pivotally connected a pair of members 34 swingable about upright axes, respectively, and receiving at their outer ends a shaft forming part of an end roll means. FIG. 8 illustrates a pair of opposed end roll means 36 and 38 the shafts of which are thus connected to and freely rotatable with respect to the swingable components 34. The right component 34 which is connected to the front end roll means 38 may be operatively connected with a suitable steering means so as to be capable of swinging in the manner shown by the arrow 40. The shaft of each end roll means carries a rotary toothed components 42 the teeth of which are received in the openings 24 in the example of FIG. 8, and of course these teeth would be received in the openings 15 in the event that the endless track means is made up of interconnected elements 11 as described above. One of these members 42 is driven from a suitable transmission in a known way, and each end roll means has a pair of outer roll components 44 as illustrated in FIG. 8. FIG. 8 also shows the interlocking toothed portions 46 at the ends of the sheet 20 with a suitable rod 48 passing through the aligned bores of the toothed portions 46 so that in this way the single sheet 20 is mounted on the pair of end roll means 36 and 38 to be supported and guided thereby. Of course in this case also the opposed side edge regions of the endless track means are stretched to have the same length as the elongated substantially non-stretchable central region 22 thereof, so that when the endless track means is mounted on the vehicle the opposed side edge regions thereof will be under a predetermined initial prestress with these opposed side edge regions tending to contract.

Figure 2:
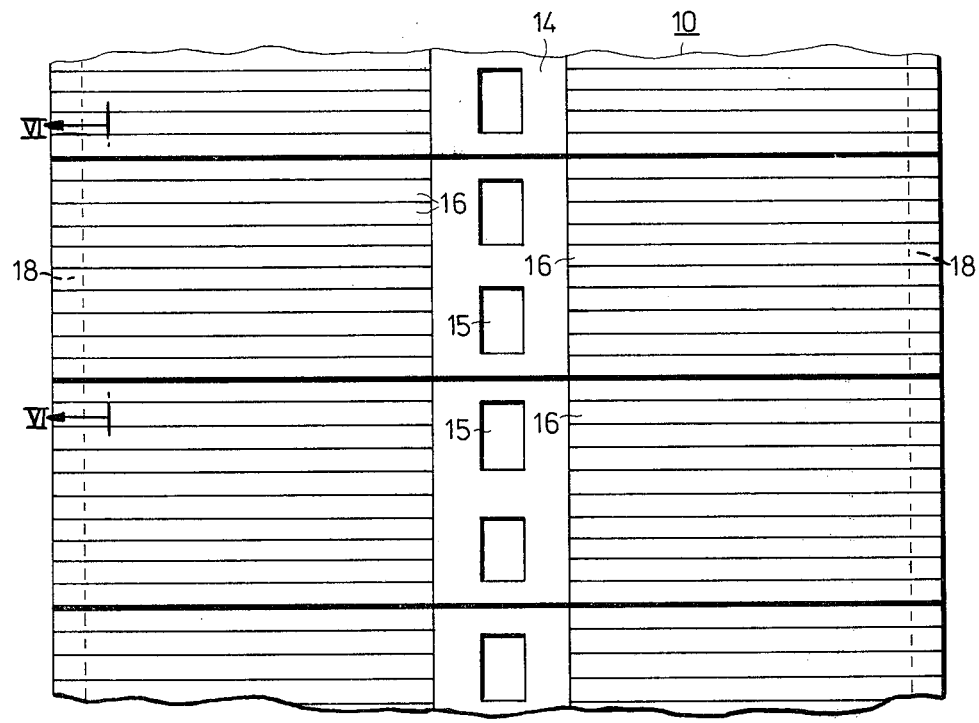
FIG. 2 is a fragmentary schematic illustration of a number of components of an endless track structure, these components differing from those of FIG. 1, with the components of FIG. 2 being shown in an assembled condition which they take when mounted on end rolls of the vehicle.
Figure 3:
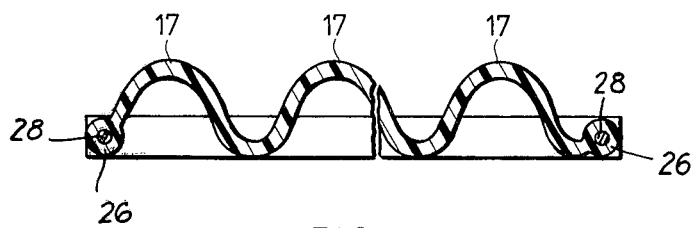
FIG. 3 is a partly sectional longitudinal elevation of the structure of FIG. 1 taken along line III—III of FIG. 1 in the direction of the arrows.
Figure 4:
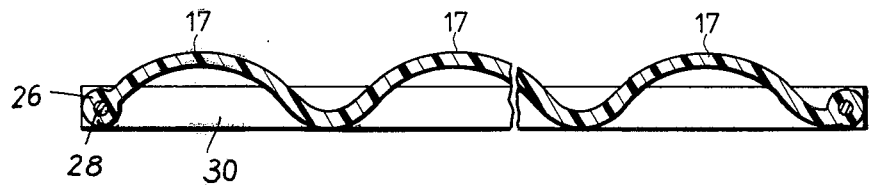
FIG. 4 shows the condition which the structure of FIG. 3 takes when a number of components as shown in FIGS. 1 and 3 are assembled to form an endless track and this endless track is mounted on the end rolls of the vehicle.
Figure 5:
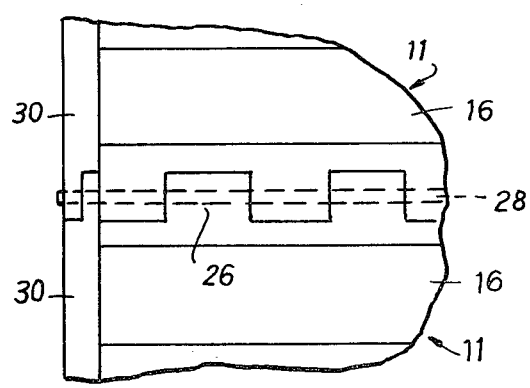
FIG. 5 is a fragmentary schematic illustration of the manner in which a series of elements of a track can be joined together.
Figure 6:
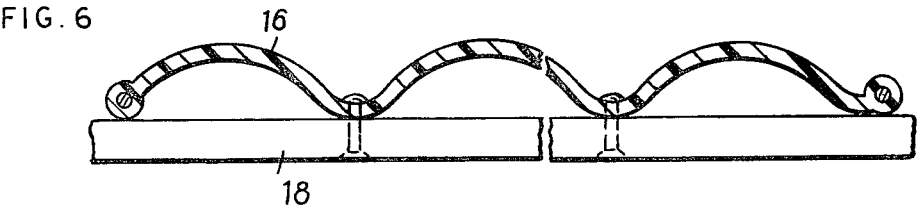
FIG. 6 is a fragmentary sectional elevation of the structure of FIG. 2 taken along line VI—VI of FIG. 2 in the direction of the arrows.

The embodiment of the invention which is illustrated in FIGS. 2 and 6 is similar to that of FIGS. 1, 3, and 4 in that this embodiment also is made up of a plurality of elements similar to the elements 11 and joined in end-to-end relation as schematically shown in FIG. 2. The connecton between the several elements may have the construction shown in FIG. 5.

However, with this embodiment the outer side edge regions of the plastic sheet material are surrounded by an elongated endless stretchable edge band 18 made of a suitable elastic material such as rubber. Thus, FIG. 6 shows how the several elongated portions 16 are joined to the endless elastic edge bands 18 as by being suitably riveted thereto, for example. Except for the connection to the endless encircling elastic band 18 the embodiment of FIGS. 2 and 6 is the same as that of FIGS. 1, 3, and 4. The advantage of providing a pair of endless elastic edge bands 18 is that while these bands will stretch and contract with the opposed side edge regions of the endless track means these endless bands 18 also can function as a means which will limit the extent to which each opposed side edge region can stretch. Thus, the dimensions and properties of each endless edge band 18 is such that it will act as a limiting means for limiting the length at each side of the endless track means 10.

When any of the embodiments of an endless track means according to the invention is mounted on a vehicle, as shown for the endless track means of FIG. 7 in FIG. 8, when the endless track means is straight, extending parallel to the direction of travel of the vehicle, as shown in FIGS. 2 and 8, the opposed side edge regions of the endless track means will be distended so that the initial tapering thereof shown in FIGS. 1 and 7 will be eliminated. Thus, at the opposed side edge regions the endless track means 10 has a given internal prestress tending to contract the endless track means at its opposed marginal areas.

When a vehicle thus equipped with an endless track means of the invention executes a turn, the endless track means will assume a curved configuration at the inner sides of the trun readily and without "bagging", inasmuch as the endless track means at the inner side of the turn will automatically contract because the internal stress is gradually reduced, with the reduction of the internal stress becoming more pronounced as the sharpness of the turn increases. The internal prestress is selected, for example, in such a way that at the minimum turning radius of the vehicle the internal stress at the inner side of the endless track means 10, which is to say at the inner side of the turn, has been reduced substantially to zero. Of course, this internal stress may be selected in such a way that at the minimum turning radius of the vehicle there still remains a minor internal stress at the inner side of the endless track means such as the inner side of the track elements 11 of the endless track means.

It is clear, however, that at the outer side of the turn the endless track means becomes stretched to an increasing degree so that the internal stress at the outer side of the turn increases to a magnitude greater than the original internal stress in the endless track means when the vehicle is straight. Of course, these operations will take place either with an endless track means composed of a number of interconnected elements, such as elements 11 or with an internal track means made of a single body of plastic sheet material as shown in FIGS. 7 and 8.

Furthermore, it is clear that with either of the above embodiments of the invention, toward the end of a turn when the vehicle again approaches travel along a straight path, at least one of the end roll means turns back toward its position parallel to the other end roll means, and thus the endless track means becomes tensioned to an increasing degree at the inside of the turn in order again to assume its initially stressed condition which it has when the pair of end roll means are parallel to each other.

The corrugated configuration of the endless track means as shown in FIGS. 3, 4, and 6, and as is also provided for the endless track means of FIGS. 7 and 8, is particularly preferred in that through this construction there is the advantage that the deformation will take place uniformly throughout the track means. There will be no abrupt local changes in the configuration of the track means. Such local abrupt changes might cause rupture in the endless track means. For example, if the endless track means have in cross section a sharp zigzag configuration, then the same uniform deformation throughout the endless track means would not be achieved.

Thus with the endless track means of the invention the vehicle, when executing a turn, will provide for the track means a curvature which is much smoother than has heretofore been attained, and much more uniform than has heretofore been possible, with the "bagging" tendency present in conventional tracks being completely eliminated. While the endless track means may be made of a single body, as shown in FIG. 7 and 8, or a plurality of elements connected one to the next, as described above, the important feature of the invention is that when the endless track means is straight and parallel to the longitudinal central axis of the vehicle, which is in the direction of travel thereof when the vehicle travels along a straight path, then at the marginal opposed side edge regions of the endless track means there prevails a predetermined inner stress tending to contract the endless track means at the opposed side edge regions thereof.

While in the drawings and in the description above certain details of advantageous embodiments of the invention have been set forth, it is clear that numerous modifications are possible in the structure of the invention without departure from the scope of the invention.

What is claimed is:

1. In a vehicle, a pair of opposed end roll means respectively having axes which extend transversely of the vehicle and an endless ground-engaging track means extending between and around said pair of opposed end roll means to be supported and guided thereby, at least one of said end roll means being turnable about an upright axis when the vehicle executes a turn, said endless track means having opposed side edge regions which are elastic and stretchable and which are in a stretched, tensioned condition when said pair of end roll means are parallel to each other, so that when said track means is in a straight condition where said pair of end roll means are parallel to each other said side edge regions are prestressed to a given degree and tend to contract, whereby when the vehicle executes a turn the endless track means will contract at its side edge region which is at the inside of the turn and will stretch to an increasing degree at its side edge region which is at the outside of the turn, said one end roll means when returning to a position parallel to the other of said end roll means toward the end of a turn cooperating with said endless track means for stretching the latter at the inside of the turn for returning said endless track means to said stretched, tensioned condition when said pair of end roll means are parallel to each other.

2. The combination of claim 1 and wherein said endless track means has a central longitudinal region which is substantially non-stretchable but laterally bendable so that at its longitudinal central region said track means can assume a given curvature when the vehicle executes a turn while avoiding stretching of said endless track means at its longitudinal central region.

3. The combination of claim 2 and wherein said endless track means is made up of a plurality of track elements which are joined one to the next and each of which in its unstressed condition has on opposite sides of its central region a laterally extending region which tapers toward its outer edge region.

4. The combination of claim 2 and wherein said endless track means consists of a single body of sheet material which in its unstressed condition has at its opposed side edge regions a length which is less than the length of the longitudinal central region.

5. The combination of claim 1 and wherein said endless track means is stretched at its opposed side edge regions by said pair of end roll means to an extent according to which when the vehicle executes a turn of minimum radius the prestress at the inner side edge region of the turn is reduced substantially to zero.

6. The combination of claim 1 and wherein said endless track means includes a pair of opposed elastic edge bands fixed to the opposed side edge regions of said endless track means.

7. The combination of claim 6 and wherein said edge bands have a limited degree of stretch for limiting the extent to which the length of the side edge region of said endless track means at the outer side of a curve can increase.

8. The combination of claim 1 and wherein said endless track means is made up of a plurality of elongated members each extending transversely of said endless track means and said members being connected one to the next.

9. The combination of claim 8 and wherein each of said members has a corrugated configuration at least at the opposed side edge regions of said endless track means.

10. The combination of claim 1 and wherein said endless track means is made of a plastic sheet material.

11. For use in a vehicle, and endless ground-engaging track means having elastic, stretchable and contractable opposed side edge regions which in an unstressed condition of said endless track means are shorter than the length of said opposed side edge regions when said endless track means is mounted on the vehicle, and said endless track means having an elongated central region situated between said opposed side edge regions and being longer than the same when said endless track means is in said unstressed condition.

12. An endless track means as recited in claim 11 and wherein said endless track means has an elongated substantially non-stretchable central region which is laterally bendable.

13. The combination of claim 1 and wherein said endless track means consists of a single body of sheet material which in its unstressed condition has at its opposed side edge regions a length which is less than the length of a longitudinal central region of said single body of sheet material, and said body of sheet material having a corrugated configuration at least at said opposed side edge regions thereof.

14. The combination of claim 1 and wherein said endless track means is stretched at its opposed side edge regions by said pair of end roll means to an extent according to which when the vehicle executes turn of minimum radius the prestress at the inner side edge region of the turn is reduced to such an extend that a minor internal stress still remains at the inner side edge region of the turn.

* * * * *